United States Patent
Abadi et al.

(10) Patent No.: US 9,830,149 B2
(45) Date of Patent: Nov. 28, 2017

(54) AUTOMATIC EXTRACTION OF SENSITIVE CODE FRAGMENTS TO BE EXECUTED IN A SANDBOX

(71) Applicant: International Business Machines Corporation, Armonk, NY (US)

(72) Inventors: Aharon Abadi, Petach Tikva (IL); Idan Ben-Harrush, Givat Elah (IL); Nili Ifergan-Guy, Haifa (IL); Dmitri Pikus, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/995,217

(22) Filed: Jan. 14, 2016

(65) Prior Publication Data
US 2017/0206082 A1    Jul. 20, 2017

(51) Int. Cl.
*G06F 9/44*    (2006.01)
*H04L 29/06*    (2006.01)
(Continued)

(52) U.S. Cl.
CPC ............ *G06F 8/72* (2013.01); *G06F 21/57* (2013.01); *G06F 21/6218* (2013.01);
(Continued)

(58) Field of Classification Search
CPC .......... G06F 21/57; G06F 21/52; G06F 21/53; G06F 21/56; G06F 21/552;
(Continued)

(56) References Cited

U.S. PATENT DOCUMENTS 7,051,200 B1 *  5/2006  Manferdelli ............ G06F 21/10
                                                        705/57
7,412,603 B2 *  8/2008  Yeates .................. G06F 21/6245
                                                        713/182
(Continued)

OTHER PUBLICATIONS

Aharon Abadi et al., Fine Slicing Theory and Application for Computation Extraction, 2012, [Retrieved on Nov. 15, 2016]. Retrieved from the internet: <URL: http://link.springer.com/chapter/10.1007%2F978-3-642-28872-2_32> 15 Pages (471-485).*
(Continued)

*Primary Examiner* — Thuy Dao
*Assistant Examiner* — Anibal Rivera

(57) ABSTRACT

According to an aspect of some embodiments of the present invention there is provided a computer implemented method of refactoring a source code that includes a plurality of references to sensitive data into at least two separate source codes, comprising receiving a source code comprising a plurality of references to sensitive data, identifying a plurality of code blocks comprising the plurality of references, refactoring the source code into an enterprise source code having a plurality of functions containing the plurality of code blocks and a cloud source code that is semantically equivalent when executed to the source code when executed, and replacing within the cloud source code at least one of the plurality of code blocks with a call to a function within the enterprise source code, the function containing a code block that is semantically identical to the replaced code block.

18 Claims, 3 Drawing Sheets

(51) Int. Cl.
  *G06F 17/00* (2006.01)
  *G06F 21/57* (2013.01)
  *G06F 21/62* (2013.01)
  *G06F 21/64* (2013.01)
  *G06F 9/445* (2006.01)
  *G06F 9/45* (2006.01)

(52) U.S. Cl.
  CPC .............. *G06F 21/645* (2013.01); *G06F 8/48* (2013.01); *G06F 8/65* (2013.01); *G06F 8/70* (2013.01)

(58) Field of Classification Search
  CPC ...... G06F 21/6245; G06F 21/10; G06F 21/14; G06F 21/6218; G06F 21/6209; G06F 21/602; G06F 21/6227; G06F 21/60; G06F 8/72; G06F 8/65; G06F 8/10; G06F 8/70; G06F 8/48; G06F 17/30557; G06F 17/3048; G06F 21/645; G06F 21/126; G06F 21/606; G06F 21/316; G06F 8/31; G06F 11/3608; G06F 11/3664; G06F 9/52; G06F 17/30528
  See application file for complete search history.

(56) References Cited

U.S. PATENT DOCUMENTS

| | | | |
|---|---|---|---|
| 7,584,354 B2* | 9/2009 | Graunke | G06F 21/14 713/167 |
| 8,032,409 B1* | 10/2011 | Mikurak | G06Q 10/00 705/14.39 |
| 8,127,360 B1* | 2/2012 | Wilhelm | G06F 21/552 726/25 |
| 8,185,752 B2* | 5/2012 | Dodd | H04L 9/083 380/277 |
| 8,191,054 B2* | 5/2012 | Kilbane | G06F 12/0811 717/149 |
| 8,402,435 B1* | 3/2013 | Spiro | G06F 8/48 717/120 |
| 8,489,894 B2* | 7/2013 | Comrie | G06F 21/6209 713/172 |
| 8,539,593 B2* | 9/2013 | Tan | G06F 21/6218 717/144 |
| 8,656,370 B2* | 2/2014 | Murthy | G06F 11/3608 717/132 |
| 8,694,971 B2* | 4/2014 | Chandra | G06F 8/72 717/124 |
| 8,898,794 B1* | 11/2014 | Borac | G06F 9/52 717/128 |
| 9,053,319 B2* | 6/2015 | Chess | G06F 21/53 |
| 2003/0093683 A1* | 5/2003 | Wong | G06F 21/126 713/189 |
| 2003/0105858 A1* | 6/2003 | Hogg | G06F 17/3048 709/224 |
| 2004/0128552 A1* | 7/2004 | Toomey | G06F 21/57 726/22 |
| 2005/0097524 A1* | 5/2005 | Hasegawa | G06F 21/52 717/136 |
| 2008/0163382 A1* | 7/2008 | Blue | G06F 8/31 726/28 |
| 2008/0216174 A1* | 9/2008 | Vogel | G06F 21/6245 726/22 |
| 2009/0144619 A1* | 6/2009 | Best | G06F 21/6245 715/277 |
| 2009/0240956 A1* | 9/2009 | Metzger | G06F 21/6227 713/193 |
| 2009/0282391 A1* | 11/2009 | Gutierrez | G06F 8/10 717/128 |
| 2010/0031023 A1* | 2/2010 | Dodd | H04L 63/0428 713/155 |
| 2010/0192220 A1* | 7/2010 | Heizmann | G06F 11/3664 726/19 |
| 2010/0205189 A1* | 8/2010 | Ebrahimi | G06F 21/6227 707/757 |
| 2010/0212010 A1* | 8/2010 | Stringer | G06F 21/52 726/22 |
| 2010/0241855 A1* | 9/2010 | Chou | G06F 21/10 713/168 |
| 2010/0262841 A1* | 10/2010 | Ekberg | G06F 21/645 713/193 |
| 2011/0145918 A1* | 6/2011 | Jung | G06F 21/52 726/22 |
| 2011/0307486 A1* | 12/2011 | Breslau | G06F 21/6245 707/737 |
| 2011/0307951 A1* | 12/2011 | Yermakov | H04L 63/0227 726/12 |
| 2012/0072992 A1* | 3/2012 | Arasaratnam | G06F 21/602 726/26 |
| 2012/0089835 A1* | 4/2012 | Peckover | G06F 21/10 713/168 |
| 2013/0124412 A1* | 5/2013 | Itwaru | G06Q 20/322 705/44 |
| 2013/0124413 A1* | 5/2013 | Itwaru | G06Q 20/4012 705/44 |
| 2013/0160133 A1* | 6/2013 | Avgerinos | G06F 21/57 726/26 |
| 2013/0227641 A1* | 8/2013 | White | H04L 63/20 726/1 |
| 2014/0040997 A1* | 2/2014 | Anantharaju | G06F 21/53 726/5 |
| 2014/0157380 A1* | 6/2014 | Abrams | H04L 67/42 726/7 |
| 2014/0201807 A1* | 7/2014 | White | G06F 21/53 726/1 |
| 2014/0325670 A1* | 10/2014 | Singh | G06F 21/60 726/26 |
| 2014/0344943 A1* | 11/2014 | Todeschini | G06F 21/6209 726/26 |
| 2015/0012565 A1* | 1/2015 | Engberg | G06F 17/30557 707/783 |
| 2015/0026462 A1* | 1/2015 | Ramesh | G06F 21/6218 713/165 |
| 2015/0033223 A1* | 1/2015 | Chari | H04L 63/105 718/1 |
| 2015/0095367 A1* | 4/2015 | Mattsson | G06F 17/30528 707/769 |
| 2015/0205954 A1* | 7/2015 | Jou | G06F 21/316 726/22 |
| 2015/0356303 A1* | 12/2015 | Plastina | G06F 21/60 726/28 |
| 2016/0132696 A1* | 5/2016 | Vidhani | G06F 21/6245 726/28 |
| 2016/0134595 A1* | 5/2016 | Lavinio | G06F 21/606 713/168 |
| 2016/0171235 A1* | 6/2016 | Konik | G06F 21/6227 707/784 |
| 2016/0179660 A1* | 6/2016 | Young | G06F 8/70 717/126 |
| 2016/0188317 A1* | 6/2016 | Hilliar | G06F 8/65 717/172 |
| 2016/0219055 A1* | 7/2016 | Hilliar | H04L 63/0428 |

OTHER PUBLICATIONS

Aharon Abadi et al., Code-Motion for API Migration: Fixing SQL Injection Vulnerabilities in Java, 2011, [Retrieved on Nov. 15, 2016]. Retrieved from the internet: <URL: http://delivery.acm.org/10.1145/1990000/1984734/p1-abadi.pdf?> 7 Pages (1-7).*

Nenad Jovanovic et al., Pixy: A Static Analysis Tool for Detecting Web Application Vulnerabilities, IEEE 2006, [Retrieved on Jun. 30, 2017]. Retrieved from the internet: <URL: http://ieeexplore.ieee.org/stamp/stamp.jsp?arnumber=1624016> 6 Pages (1-6).*

Anh Tuan Nguyen et al., Graph-Based Pattern-Oriented, Context-Sensitive Source Code Completion, Jun. 2-9, 2012, [Retrieved on Jun. 30, 2017]. Retrieved from the internet: <URL: http://delivery.acm.org/10.1145/2340000/2337232/p69-364-nguyen.pdf?> 11 Pages (69-79).*

(56) References Cited

OTHER PUBLICATIONS

Yunhui Zheng et al., "Path sensitive static analysis of web applications for remote code execution vulnerability detection", Software Engineering (ICSE), 2013 35th International Conference on Date of Conference: May 18-26, 2013, pp. 652-661.

* cited by examiner

AUTOMATIC EXTRACTION OF SENSITIVE CODE FRAGMENTS TO BE EXECUTED IN A SANDBOX

BACKGROUND

The present invention, in some embodiments thereof, relates to a method to efficiently develop code that prevents unauthorized access to sensitive enterprise data and, more specifically, but not exclusively, to a method replacing code blocks in a source code that reference sensitive data with remote procedure calls to a new source code containing the code blocks of sensitive data.

A growing challenge to software developers is integrating separate software applications designed to work together, for example a client and a server application. Another example of integrating separate software programs are applications that need to communicate from within and from outside an enterprise security network.

For example, a bank may maintain on a secured network a database comprised of both sensitive data and non-sensitive data. Sensitive data may comprise any data that is not intended for public access, for example a customer's internet transaction history, credit card numbers, etc. Non sensitive data may comprise any data that is publicly available, for example a customer's first name. While both sensitive and non sensitive data are stored within a secured enterprise system, enterprise applications outside the secured environment may need access to non-sensitive data.

In this case, a cloud application running external to the secured environment may use an API to request customer data from an enterprise application and/or database running within the secured environment. These two applications are generally developed separately, which is less optimal than developing a single application.

SUMMARY

According to an aspect of some embodiments of the present invention there is provided a computer implemented method of refactoring a source code that includes a plurality of references to sensitive data into at least two separate source codes, comprising receiving a source code comprising a plurality of references to sensitive data, identifying a plurality of code blocks comprising the plurality of references, refactoring the source code into an enterprise source code having a plurality of functions containing the plurality of code blocks and a cloud source code that is semantically equivalent when executed to the source code when executed, and replacing within the cloud source code at least one of the plurality of code blocks with a call to a function within the enterprise source code, the function containing a code block that is semantically identical to the replaced code block.

Optionally, the sensitive data comprising data that is not meant for public access, for example credit card numbers, passwords, and/or trade secrets.

Optionally, the sensitive data is received from a list generated automatically by parsing documentation of the source code and/or by manual input by a person Optionally, the one or more of a plurality of the code blocks is identified in the source code by one or more of a plurality of methodologies comprising information retrieval algorithms, manually by a person, and/or any other link traceability method.

Optionally, the one or more of a plurality of the code blocks is identified in the source code by assigning a weighting factor to words in a source code according to a list of sensitive data terms and by extracting words from compound phrases in source code according to at least one rule or coding standard of a member of a group consisting camel case, underscore separation, compound names, and/or any other programming language naming convention.

Optionally, using an information retrieval algorithm to identify synonyms to words or phrases in source code and assigning the weighting factor to the synonyms according to the list of sensitive data.

Optionally, the refactoring is accomplished according to one or more of a plurality of methodologies for refactoring non contiguous code selected from a group consisting of Fine Slicing Theory and Applications for Computational Extraction, extract computation, extract method, and program slicing and sliding.

Optionally, the references to a database in the source code are replaced with references to a user specific enterprise databases in the enterprise source code according to manual changes to the enterprise source code and/or according to the methodology "Code Motion for API Migration Fixing SQL Injection Vulnerabilities in Java".

Optionally, the call from the cloud source code to the enterprise source code is implemented by one or more of a plurality of methodologies comprising a remote procedure call (RPC), Remote Method Invocation (RMI), SAP Remote Function Call, Java Remote Method Invocation, Apache Thrift protocol and framework, Microsoft .NET Remoting, and/or any other variation of RPC.

Optionally, a return value of the RPC and/or the variation of RPC is dynamically changed to remove sensitive data by one of a plurality of methods selected from a dynamic analysis method.

Optionally, transferring of sensitive data from the enterprise source code when executing to the cloud source code when executing is prevented by manually preventing transfer of sensitive data from the enterprise source code and/or by the methodology "A Scheme for Dynamic Dataflow Analysis for Dynamic Languages with Support for Asynchrony and Reflection" and/or any of a plurality of methods selected from a dynamic analysis method.

Optionally, the code block contained by the function is semantically equivalent to the replaced code block.

Optionally, an entry point to the cloud source code when executed is identical to an entry point to the software code when executed.

Optionally, the cloud source code when executed is semantically equivalent to the source code when executed.

According to an aspect of some embodiments of the present invention there is provided a system for refactoring a source code into two separate source codes, comprising an interface for communicating with a user, one or more non-transitory computer-readable storage mediums, code instructions stored on at least one of the one or more storage mediums, one or more processors coupled to the interface and the program store for executing the code instructions, the code instructions comprising code instructions for receiving a source code comprising a plurality of references to sensitive data, the source code is received according to a user input via the interface, code instructions for identifying a plurality of code blocks comprising the plurality of references in the source code, code instructions for refactoring the source code into an enterprise source code having a plurality of functions containing the plurality of code blocks and a cloud source code that is semantically equivalent when executed to the source code when executed, code instructions for replacing within the cloud source code at least one of the plurality of code blocks with a call to a function containing a corresponding code block located within the enterprise source code, and code instructions for sending to the user the cloud source code and the enterprise source code via the interface when the stored source code has completed execution.

Optionally, the code instructions for receiving a file comprising a text list of the sensitive to determine the code blocks, the list is received according to a user input received via the interface.

Optionally, the interface comprising a graphic user interface (GUI) allowing the user to input the source code by manually inputting a file name and a directory path and/or to the list of sensitive data, and/or to drag and drop a file containing the source code and/or a file containing the list of sensitive data into the GUI.

Optionally, the code instructions for receiving via the interface text input manually by the user, the text comprising a list of at least one sensitive data.

Optionally, the code instructions for the interface to allow the user to initiate execution of the code instructions.

Optionally, a source code that when executed dynamically identifies and removes sensitive data from data fields sent by the functions in the enterprise source code when executed to the cloud source code when executed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
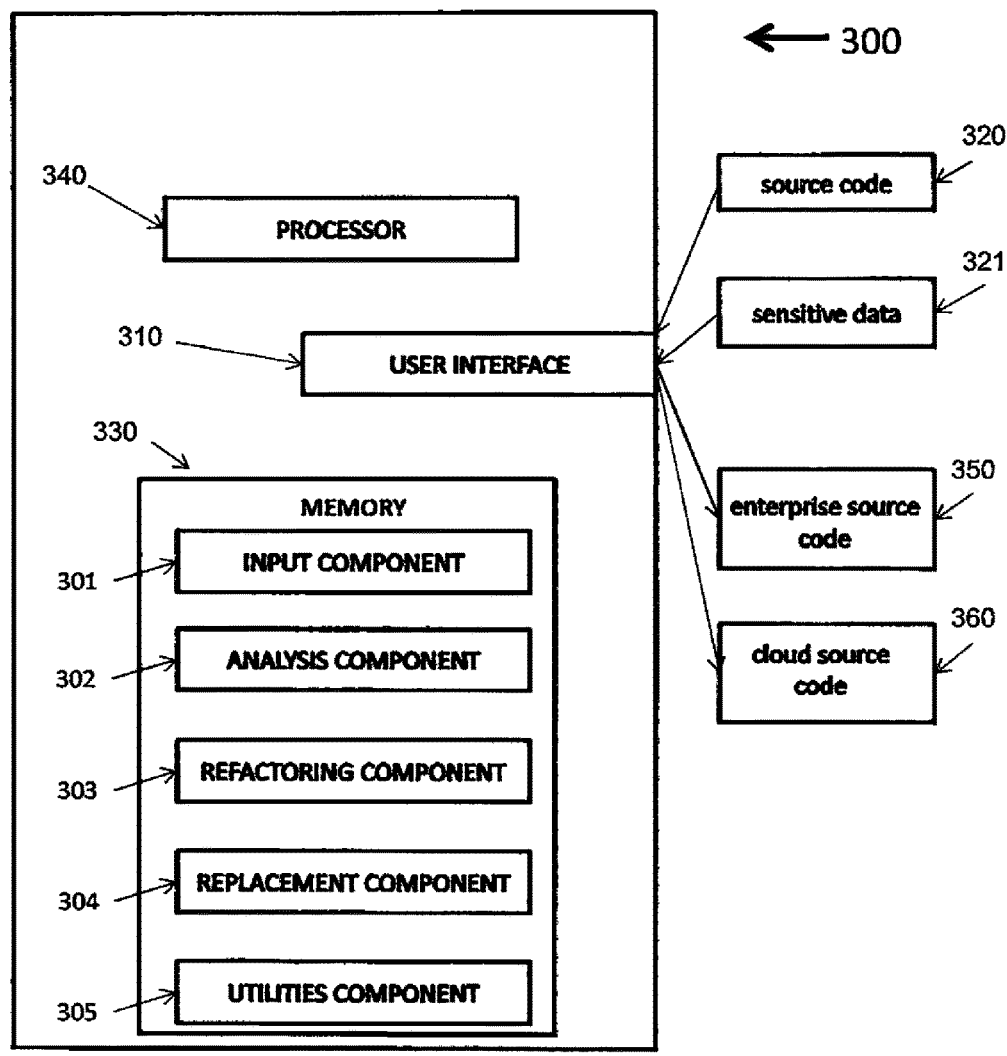
FIG. 1 is a schematic illustration of an exemplary system for generating an enterprise source code and a cloud source code from a source code, into according to some embodiments of the present invention.

The present invention, in some embodiments thereof, relates to a method to efficiently develop code that prevents unauthorized access to sensitive enterprise data and, more specifically, but not exclusively, to a method for replacing references to sensitive data in a source code with remote procedure calls to a new source code containing the references to sensitive data.

Enterprise applications often need to communicate from a secured enterprise network to a non secured network. A secured enterprise computer network, referred to herein as an enterprise network, for example a corporate intranet, has a firewall and other data security measures to prevent unauthorized access. A non secured network, referred to herein as a cloud network, allows public access, for example the internet.

Applications running within an enterprise networks may have access to sensitive data, while applications running on a cloud network will not have access to sensitive data. Optionally, sensitive data may comprise data that the owner of the enterprise has obligations to protect, for example customer credit card numbers, customer passwords for remote access, pricing by suppliers, and/or customer transaction history. Sensitive data may also comprise data that would cause commercial harm to the enterprise if accessed by competitors, for example lists of contact information for customers, trade secrets, cost of goods sold, lists of suppliers, and/or sales history. Sensitive data may also comprise any other data that the enterprise has decided, for any reason, to protect from public access.

Creating multiple applications that need to communicate with each other is more complex than creating a single application with equivalent functionality. Complexity increases both the cost of developing applications and the likelihood of mistakes. For example, an application that needs access to both sensitive and non sensitive data would require two applications to be developed, one to access sensitive data from within the enterprise network, and a separate application to access non sensitive data in a cloud network. However, given the requirements to operate in remote environments with different security requirements, the present art does not allow developing a single application that executes within both the cloud network and the enterprise network.

Some embodiments of the present invention are based on a computerized process executed by processor(s) for refactoring a single source code into two separate source codes. Refactoring as used herein refers to a process of replacing a source code of a single application with source codes of two separate applications that when executed together have the same functionality as the original source code. Software developers may create one application designed to execute in both secured and cloud environments, and subsequently refactor the source code into two or more source codes that execute either in a secured environment or in a cloud. By developing one application instead of two the complexity, time, and cost of development is reduced.

Some embodiments of the present invention teach methods wherein a list of sensitive data and a source code with references to the sensitive data is received from a user, and the user receives from a computerized system and/or manual editing an enterprise source code and a cloud source code.

Some embodiments of the present invention teach methods wherein a generic source code with references to generic sensitive data is developed by a third party and sold and/or transferred to a user. The user may also receive computerized tools and/or manual methods described herein to refactor the generic source code into a cloud source code and an enterprise source code, and adapt the cloud source code and enterprise source code to integrate with the user enterprise.

The enterprise source code is designed to execute within an enterprise network that grants access to sensitive data, and the cloud source code is designed to execute in a cloud network and provide services to customers of the user outside the secured enterprise. The cloud source code includes all the functionality of the source code, except that references to sensitive data are replaced with function calls to the enterprise source code. Each function call is directed to a function in the enterprise source code that contains the corresponding referenced sensitive data replaced from the cloud source code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a schematic illustration of an exemplary system for refactoring into two source codes a single source code received from a user, according to some embodiments of the present.

Refactoring system 300 comprises a UI 310 for receiving and sending files and data to and from a user, for example the source code and a list of sensitive data, a non-transitory memory 330 for storing code instructions and data, for example code instructions to refactor the source code and the list of sensitive data, and one or more processor(s) 340. Optionally, the UI may be a Graphical User Interface (GUI) or a different human-machine interfaces, for example a text interface and/or audio interface. The GUI may present one or more users a visual interface displayed on a screen coupled with input devices, for example a keyboard, touch screen, and/or a pointing device.

The UI 310 receives a source code 320 and sensitive data 321 from a user, from a networked location, and/or from a location within memory 330. Optionally the list of sensitive data may be input manually by a user, and/or a file name and file location of a file comprising a list of sensitive data may be provided to the UI. Optionally the source code may be cut and pasted into the UI, and/or a file name and file location of the source code may be provided to the UI by the user.

Memory 330 stores code instructions and the received source code 320 and sensitive data 321. The code instructions when executed on processor 340 perform refactoring of source code 320. The code instructions stored in memory 330 are functionally divided into components, wherein a component refers to a plurality of program instructions and related data structures stored in a non-transitory medium to be executed by a processor.

Input component 301 comprises code instructions to store in memory 330 a source code 320 and sensitive data 321 received from UI 310. Analysis component 302 comprises code instructions to identify references to sensitive data according to the list of sensitive data received by UI 310. For each reference to sensitive data a surrounding code block is identified. A code block as used herein refers to a group of source code instructions and/or declarations that may be treated as a single instruction, for example a series of data assignments. The "if then" and "do while" group of instructions may also be considered a code block. A code block containing a reference to sensitive data is referred to herein as a sensitive code block.

Refactoring component 303 comprises code instructions to refactor source code 320 into a pre-enterprise source code and a pre-cloud source code. The pre-enterprise source code and the pre-cloud require further modifications by Replacement component 304 as described below. The output of Replacement component 304 is the enterprise source code and the cloud source code.

Extraction component 304 contains code instructions transform the pre-enterprise source code into the enterprise source code, and to transform the pre-cloud source code into the cloud source code, as described here. At least one identified sensitive code block in the pre-cloud source code is extracted and replaced with a function call to a function in the pre-enterprise source code. The pre-enterprise source code is populated with functions that are callable from the pre-cloud source code. Each function call in the pre-cloud source code points to a function semantically equivalent to the sensitive code block that is extracted and replaced. After the code instructions in Replacement component 304 have executed, the pre-enterprise source code has been transformed into the enterprise source code, and the pre-cloud source code has been transformed into the cloud source code. Replacement component 304 further contains code instructions to send the cloud source code and the enterprise source code to the user via interface 310.

Optionally, when the cloud source code and the enterprise source code are executed, utilities component 305 contains source code that when executed prevents enterprise source code from sending sensitive data to the cloud source code.

Figure 2:
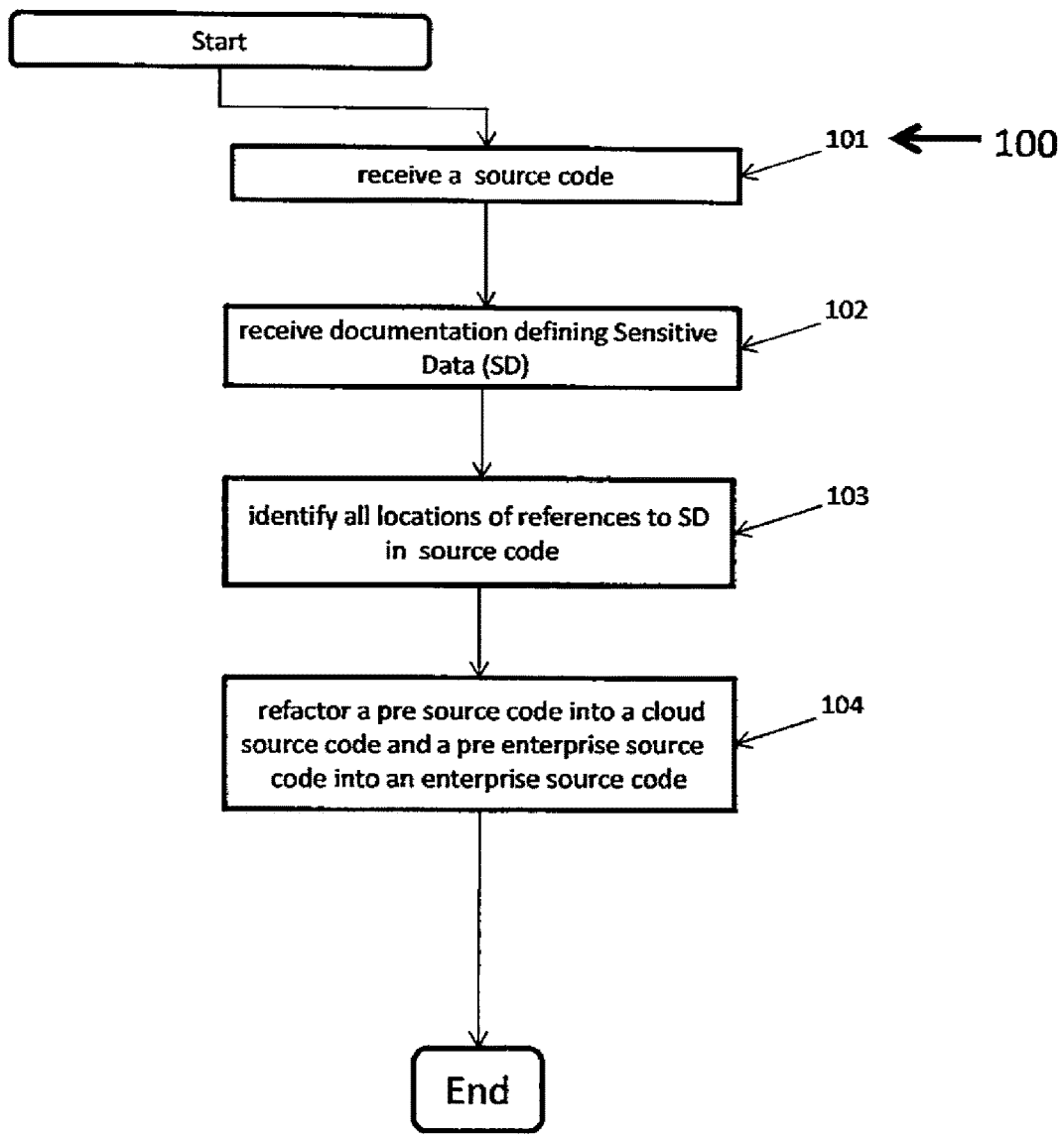
FIG. 2 is a flowchart of an exemplary method for refactoring a source code and into a pre-enterprise source code and a pre-cloud, according to some embodiments of the present invention.

Reference is now made to FIG. 2 which is a flowchart of an exemplary process 100 for receiving a list of sensitive data and a source code and generating an enterprise source code and a cloud source code, according to some embodiments of the present invention. Exemplary process 100 is executed by one or more processors 340 and stored in memory 330, for example as an independent tool.

As shown in 101, a source code is received via UI 310 from one or more users, an enterprise network database, and/or from a location in memory 330, and stored in memory 330 by input component 301. The source code comprises an application source code with at least one reference to sensitive data. The source code may be written in any type of programming language, including object oriented, procedural, event driven, compiled, and/or interpreted. The source code may be executed in any type of operating system including multi tasking, distributed, and/or real time.

As shown in 102, a list of sensitive data is received from one or more users, an enterprise network database, and/or from a location in memory 330 via UI 310. Optionally, the list of sensitive data may be a list of data types generated automatically from documentation of the source code and/or documentation of a database referenced by the source code. Optionally, the list of sensitive data may be loaded manually by a user via UI 310.

As shown in 103, sensitive data in the source code is identified by code instructions in analysis component 302 when executed on processor 340. Each sensitive code block is identified.

Optionally, the methodology of identifying sensitive data may comprise manually searching for text within the source code, executing code that performs information retrieval algorithms, and/or any other link traceability method.

Optionally the methodology for identifying sensitive data may comprise a method of parsing the source code wherein each word in a line of source code is assigned a numerical priority, for example from zero to "10". When the sum of numerical priorities for a line of code is above a given threshold, the code line is identified as containing sensitive data. The numerical priority of each word may be set according to rules, for example reserved words of a programming language may be assigned a priority of zero, and words on the sensitive data list would be assigned a priority of "10". Words on the list of sensitive data may be extracted from compound phrases according to coding standards. Examples of coding standards includes Camel coding, wherein letters are words are identified within phrases according to capitalized letters, for example the phrase CustomerCare.priority may be parsed as "Customer" and "Care". Another example of a coding standard is underscore separation, for example "customer_care" may be parsed as "customer" and "care". Priority may also be influenced by context, for example a function named "CustomerCare" may receive a priority of "10", whereas a local variable named "CustomerCare" may receive a priority of "5".

As shown in 104, the source code is refactored by code instructions in refactoring component 303 into a pre-enterprise source code and a pre-cloud source code executed on processor 340. The pre-enterprise and pre-cloud source codes require further modification as now explained below to be transformed into the enterprise source code and the cloud source code.

As shown in 104 refactoring component 303 contains further code instructions such that the pre-cloud source code is an executable application, and the pre-enterprise source code executes when called by a function call from the pre-cloud source code.

Optionally the pre-cloud source code is semantically equivalent to the source code 320. Semantically equivalent codes use identical or similar source code declarations and/or statements for a given computer programming instruction.

Optionally, an entry point of the pre-cloud source code when executed is identical to an entry point of the source code when executed. The entry point of a code when executed is the point at which control of a hardware processor is transferred from the operating system to a user program.

The code instructions 303 for refactoring the source code is implemented by any methodology for refactoring non contiguous code, for example "Fine Slicing Theory and Applications for Computation Extraction" by Aharon Abadi, extract computation, extract method, and program slicing and sliding. The methodology may support generating two source codes from a single source code as explained above in 104.

Refactoring may require dividing a code object and/or data structure in the source code into multiple code objects in both the pre-enterprise source code and the pre-cloud source code, for example when an object has data fields that include sensitive data as well as data fields that require access from the pre-cloud source code. The sliding refactoring methodology mentioned above for refactoring may require manual dividing of objects and/or data structures between the pre-cloud code and the pre-enterprise code.

Figure 3:
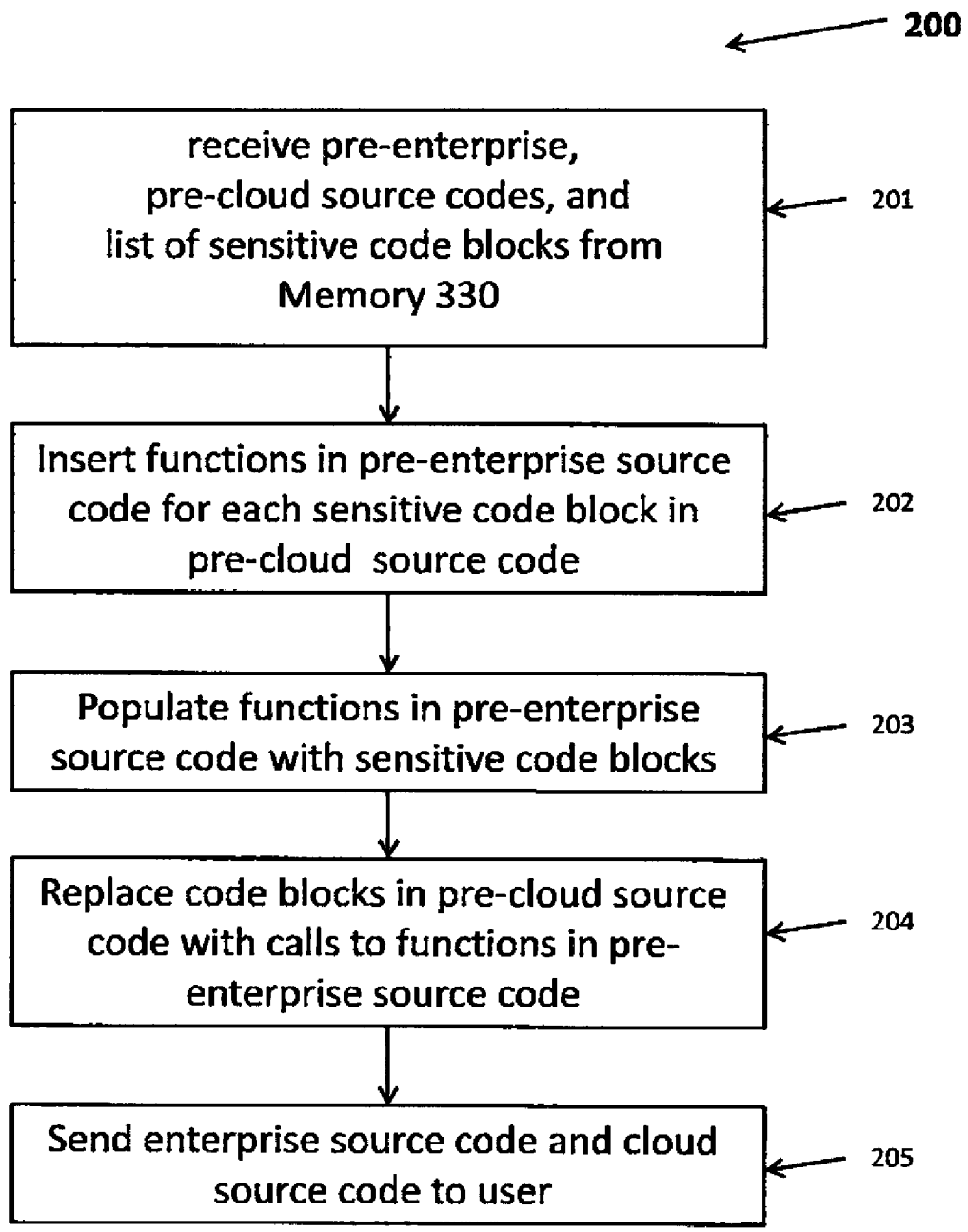
FIG. 3 is a flowchart of an exemplary process for transforming a pre-enterprise source code and a pre-enterprise source code into the enterprise source code and the cloud source code, according to some embodiments of the present invention.

Reference is now made to FIG. 3, which is a flowchart of an exemplary process 200 for modifying refactored source codes, as shown in 104, according to some embodiments of the current invention.

As shown 201 and as shown above in 104, a pre-enterprise source code and a pre-cloud source code with sensitive code blocks are stored in memory 330.

As shown in 202, for at least one identified sensitive code block a corresponding function is inserted into the pre-cloud source code by code instructions in replacement component 304 executed on processor 340.

As shown in 203, each function when executed has the same functionality as the corresponding sensitive code block when executed. Optionally, the sensitive code block may be copied into the corresponding function, with glue logic inserted to make the called function executable. Optionally, each function is semantically equivalent to the corresponding sensitive code block.

The functions in the pre-enterprise code may pass objects and/or data structures to the pre-cloud code that includes sensitive data. This is may be prevented by static techniques including manually editing all objects and/or data structures passed to the pre-cloud code, and/or by using dynamic techniques, for example as described in "A Scheme for Dynamic Dataflow Analysis for Dynamic Languages with Support for Asynchrony and Reflection".

References to a database in the pre enterprise code may require modification when the user has an enterprise database which is accessed in a different manner than the source code, for example the user enterprise database has a different API than what is referenced in the source code. Optionally, modification of database access may be accomplished manually and/or assisted by a computer program using static analysis and refactoring techniques, for example as described in "Code-motion for API Migration: Fixing SQL Injection Vulnerabilities in Java" by Aharon Abadi.

As shown in 204, code instructions in replacement component 304 are executed on processor 340 to replace at least one sensitive code block in the pre-cloud source code with a function call to the corresponding function in the pre-enterprise source code. Optionally the function call may be a Remote Procedure Call (RPC), or any variant of RPC, for example Remote Method Invocation (RMI), SAP Remote Function Call, Java Remote Method Invocation, Apache Thrift protocol and framework, and/or Microsoft .NET Remoting.

As shown in 204, the pre-enterprise source code has been transformed into the enterprise source code 350, and the pre-cloud source code has been transformed into the cloud source code 360. As shown in 205, UI 310 delivers the enterprise source code 350 and the cloud source code 360 to a user.

Optionally the cloud source code when executed and the source code when executed are semantically equivalent. Optionally, the cloud source code is semantically identical to the source code.

Optionally the enterprise source code when executed provides the cloud source code when executed with non sensitive data, as described above. The enterprise source code when executed does not provide sensitive data to the cloud source code when executed.

Optionally, a method of dynamic analysis is used to prevent an RPC or any variant of RPC from transferring sensitive data from the enterprise source code when executed to the cloud source code when executed.

Some embodiments of the present invention are provided by means of examples. An exemplary pseudo code segment presenting an exemplary source code is shown in code excerpt 1. Code excerpt 1 describes a source code such as a source code shown in 101 which includes sensitive data that may be identified as shown in 103.

The code excerpt 1 is based on the exemplary scenario wherein the user is a credit card company. In this exemplary scenario a customer has supplied a login name and password to the user's cloud network via a computer terminal or an internet in order to perform a transaction. The credit card company needs to apply the proper fee discount to the transaction based on customer classification. The credit card company has the following four policies regarding customers:

1. In order to get customer information, one needs to supply customer login name and password;
2. Customer information includes, among other details, a credit card number.
3. A credit card number prefix is used to classify customers; in this example the prefix 123 designates a premium customer.
4. The credit card number is sensitive data that should not be exposed outside of the enterprise.

Code Excerpt 1:

```
L1    function process_users(login2user, db} (
L2        for(var loginName in login2user} (
L3            var userObj = login2user[loginName;[
L4            var password = userObj.getPwd;( )
L5            var userDetails = db.getUserDetails(loginName, password;(
L6            if(userDetails.getCCNumber( ).startsWith("123} (("
L7                userObj.setDiscount;( )
L8        {
L9        {
L10   {
```

As shown in the above code segment, a generic database, "db" is referenced, and sensitive data in the form of credit card number is referenced in "getCCNumber( )".

As shown above in analysis component 302, sensitive data is identified in the source code. In code excerpt 1 lines L5 and L6 contain the words "db", "database", "user", "customer", "details", "loginname", "cc", "credit card", "password", "information", "get", "123". Optionally a plurality of methodologies, as described here and as described above in 103, are used to identify a sensitive code block. In this example, L5 and L6 are identified as a sensitive code block.

As shown above in refactoring component 303, the source code is refactored into a pre cloud code and a pre enterprise code based on the identified sensitive code blocks. An exemplary pseudo code segment presenting an exemplary pre cloud code refactored from code excerpt 1 is shown in code excerpt 2. An exemplary pseudo code segment presenting an exemplary pre enterprise code refactored from code excerpt 1 is shown in code excerpt 3.

Code Excerpt 2:

```
function PRE_CLOUD_process_users(login2user, db} (
    var userCredentials    ;[ ] =
    for(var loginName in login2user} (
        var user = login2user[loginName;[
        var pwd = user.getPwd;( )
        userCredentials.push({loginName, pwd({
{
    var results = PRE_ENTERPRISE_checkIsPremium(userCredentials,
    db ;(
    for(var result in results} (
        var user = login2user[result.loginName;[
        if(result.isPremium} (
            user.setDiscount;( )
{
{
{
```

Code Excerpt 3:

```
function PRE_ENTERPRISE_checkIsPremium(userCredentials, db} (
    var results ; { } =
    for(var cred in userCredentials} (
        var userDetails = db.getUserDetails(cred.loginName,
        cred.password;(
```

```
    results.push{"isPremium" : userDetails.
       getCCNumber( ).startsWith("123"),
"loginName": loginName;{
{
    return results;
{
```

As shown in code excerpt 2, a function call to "PRE_ENTERPRISE_checkIsPremium" replaces the sensitive code block L5 and L6 in code excerpt 1. As shown in code excerpt 3 the function "PRE_ENTERPRISE_checkIsPremium" comprises the references to "db" from lines L5 and L6 of code excerpt 1.

As shown above in 204, code instructions in replacement component 304 are now executed on processor 340 to replace the function call to PRE_ENTERPRISE_checkIsPremium in pre-cloud source code with a remote procedure call or equivalent. As shown below, code excerpt 4 is an exemplary code segment of a cloud code derived from pre-cloud code in code excerpt 2. As shown below, code excerpt 5 is an exemplary code segment of an enterprise code derived from pre-enterprise code in code excerpt 3.

Code Excerpt 4:

```
function CLOUD_process_users(login2user} (
    var userCredentials    ;[ ] =
    for(var loginName in login2user} (
       var user = login2user[loginName;[
       var pwd = user.getPwd;( )
       userCredentials.push({loginName, pwd({
{
    var results = rpc_call({funcName: ENTERPRISE_checkIsPremium,
params: [userCredentials ;([
       for(var result in results} (
          var user = login2user[result.loginName;[
          if(result.isPremium} (
             user.setDiscount;( )
{
{
{
```

As shown above in code excerpt 4, the exemplary cloud code has a remote procedure call or equivalent "rpc_call ({funcName: checkIsPremium, params: [userCredentials])" which calls to the exemplary enterprise code as shown in code excerpt 5.

In code excerpt 2 exemplary pre cloud code passes a reference to a generic database "db" to the pre enterprise code. In code excerpt 4 exemplary cloud code, the generic database "db" is extracted from the RPC or equivalent to the enterprise source code. As shown in code excerpt 5 below the extracted references to generic database "db" are replaced within the exemplary enterprise code with references to the user's enterprise database "enterprise_DB".

Code Excerpt 5:

```
    function ENTERPRISE_checkIsPremium(userCredentials} (
       var results ;{ } =
       for(var cred in userCredentials} (
          var userDetails  = enterprise_DB.
    getEnterpriseUser(cred.loginName, cred.password;(
             results.push{"isPremium"  :   userDetails.
    getCCNumber( ).startsWith("123"), "loginName": loginName;{
       {
          return filterResults(results;(
```

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computer systems will be developed and the scope of the term system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of refactoring a source code that includes a plurality of references to sensitive data into at least two separate source codes, comprising:
   receiving a source code comprising a plurality of references to sensitive data;
   identifying a plurality of code blocks comprising said plurality of references, one or more of said plurality of code blocks is identified in said source code by assigning a weighting factor to words in a source code according to a list of sensitive data terms and by extracting words from compound phrases in source code according to at least one rule or coding standard of a member of a group consisting of: a camel case, an underscore separation, a compound name, and a programming language naming convention;
   using an information retrieval algorithm to identify synonyms to words or phrases in said source code and assigning said weighting factor to said synonyms according to said list of sensitive data;
   refactoring said source code into an enterprise source code having a plurality of functions containing said plurality of code blocks and a cloud source code that is semantically equivalent when executed to said source code when executed; and
   replacing within said cloud source code at least one of said plurality of code blocks with a call to a function within said enterprise source code, said function containing at least one code block semantically identical to said at least one replaced code block.

2. The method of claim 1, wherein said sensitive data comprising data that is not meant for public access, for example credit card numbers, passwords, and/or trade secrets.

3. The method of claim 1, wherein said sensitive data is received from a list generated automatically by parsing documentation of said source code and/or by manual input by a person.

4. The method of claim 1, wherein said one or more of a plurality of said code blocks is identified in said source code by one or more of a plurality of methodologies comprising information retrieval algorithms, manually by a person, and/or any other link traceability method.

5. The method of claim 1, wherein said refactoring is accomplished according to one or more of a plurality of methodologies for refactoring non contiguous code selected from a group consisting of: Fine Slicing theory and applications for computational extraction, extract computation, extract method, and program slicing and sliding.

6. The method of claim 1, wherein references to a database in said source code are replaced with references to a user specific enterprise databases in said enterprise source code according to manual changes to said enterprise source code.

7. The method of claim 1, wherein said call from said cloud source code to said enterprise source code is implemented by one or more of a plurality of methodologies comprising a remote procedure call (RPC), Remote Method Invocation (RMI), SAP Remote Function Call, Java Remote Method Invocation, Apache Thrift protocol and framework, Microsoft.NET Remoting, and/or any other variation of RPC.

8. The method of claim 7, wherein a return value of said RPC and/or said variation of RPC is dynamically changed to remove sensitive data by one of a plurality of methods selected from a dynamic analysis method.

9. The method of claim 1, further comprising transferring of sensitive data from said enterprise source code when executing to said cloud source code when executing is prevented by manually preventing transfer of sensitive data from said enterprise source code and/or by Scheme for dynamic dataflow analysis for dynamic languages with support for asynchrony and reflection and/or a dynamic analysis method.

10. The method of claim 1, wherein said code block contained by said function is semantically equivalent to said replaced code block.

11. The method of claim 1, wherein an entry point to said cloud source code when executed is identical to an entry point to said software code when executed.

12. The method of claim 1, wherein said cloud source code when executed is semantically equivalent to said source code when executed.

13. A system for refactoring a source code into two separate source codes, comprising:
    an interface for communicating with a user;
    one or more non-transitory computer-readable storage mediums;
    code instructions stored on at least one of said one or more storage mediums;
    one or more processors coupled to said interface and said program store for executing said code instructions, said code instructions comprising:
    code instructions for receiving a source code comprising a plurality of references to sensitive data, said source code is received according to a user input via said interface;
    code instructions for identifying a plurality of code blocks comprising said plurality of references in said source code, one or more of said plurality of code blocks is identified in said source code by assigning a weighting factor to words in a source code according to a list of sensitive data terms and by extracting words from compound phrases in source code according to at least one rule or coding standard of a member of a group consisting of: a camel case, an underscore separation, a compound name, and any programming language naming convention;
    code instructions for using an information retrieval algorithm to identify synonyms to words or phrases in said source code and assigning said weighting factor to said synonyms according to said list of sensitive data;

code instructions for refactoring said source code into an enterprise source code having a plurality of functions containing said plurality of code blocks and a cloud source code that is semantically equivalent when executed to said source code when executed; and code instructions for replacing within said cloud source code at least one of said plurality of code blocks with a call to a function containing a corresponding code block located within said enterprise source code.

14. The system of claim 13, further comprising code instructions for receiving a file comprising a text list of said sensitive to determine said code blocks, said list is received according to a user input received via said interface.

15. The system of claim 13, further comprising said interface comprising a graphic user interface (GUI) allowing said user to input said source code by manually inputting a file name and a directory path and/or to said list of sensitive data, and/or to drag and drop a file containing said source code and/or a the containing said list of sensitive data into said GUI.

16. The system of claim 13, further comprising code instructions for receiving via a interface, text input manually by said user, said text input comprising a list of sensitive data.

17. The system of claim 13, further comprising code instructions for said interface to allow said user to initiate execution of said code instructions.

18. The system of claim 13, further comprising a source code that when executed dynamically identifies and removes sensitive data from data fields sent by said functions in said enterprise source code when executed to said cloud source code when executed.

* * * * *